(12) United States Patent
Be et al.

(10) Patent No.: US 8,287,685 B2
(45) Date of Patent: Oct. 16, 2012

(54) AIRBAG AND PROCESS FOR ITS ASSEMBLY

(75) Inventors: Anh Be, Midland, MI (US); William Blackwood, Midland, MI (US); Loren Dale Lower, Sanford, MI (US); Robert Nelson, Bay City, MI (US); Todd Starke, Merrill, MI (US)

(73) Assignee: Dow Corning Corporation, Midland, MI (US)

(*) Notice: Subject to any disclaimer, the term of this patent is extended or adjusted under 35 U.S.C. 154(b) by 558 days.

(21) Appl. No.: 12/515,427

(22) PCT Filed: Sep. 27, 2007

(86) PCT No.: PCT/US2007/021037
§ 371 (c)(1),
(2), (4) Date: May 19, 2009

(87) PCT Pub. No.: WO2008/069856
PCT Pub. Date: Jun. 12, 2008

(65) Prior Publication Data
US 2010/0015407 A1    Jan. 21, 2010

Related U.S. Application Data (60) Provisional application No. 60/873,799, filed on Dec. 6, 2006.

(51) Int. Cl.
*B32B 37/00* (2006.01)
*B60R 21/16* (2006.01)

(52) U.S. Cl. ........ 156/314; 156/290; 156/292; 156/310; 156/315; 280/728.1; 280/743.1

(58) Field of Classification Search .................. 156/290, 156/291, 292, 310, 314, 315; 280/728.1, 280/743.1; 428/35.2
See application file for complete search history.

(56) References Cited

U.S. PATENT DOCUMENTS

| | | | |
|---|---|---|---|
| 3,983,298 | A | 9/1976 | Hahn et al. |
| 4,774,297 | A | 9/1988 | Murakami et al. |
| 5,006,372 | A | 4/1991 | Wolfer et al. |
| 5,208,097 | A | 5/1993 | Honma et al. |
| 5,248,739 | A | 9/1993 | Schmidt et al. |
| 5,328,696 | A | 7/1994 | Noel |
| 5,352,722 | A | 10/1994 | Sweet et al. |
| 5,371,128 | A | 12/1994 | Ulman et al. |

(Continued)

FOREIGN PATENT DOCUMENTS

CA    2650252    1/2008

(Continued)

OTHER PUBLICATIONS

English language abstract and translation for JP 06-199198 extracted from the PAJ database on Nov. 22, 2011, 29 pages.

(Continued)

*Primary Examiner* — John Goff
(74) *Attorney, Agent, or Firm* — Howard & Howard Attorneys PLLC (57) ABSTRACT

A process for assembling an airbag for use in vehicle applications is disclosed. The airbag has a seam made from two or more different materials (102, 104). The combination of the materials and the process for assembling the airbag minimize the need for sewn seams.

20 Claims, 3 Drawing Sheets

U.S. PATENT DOCUMENTS

| | | | |
|---|---|---|---|
| 5,399,402 A | 3/1995 | Inoue et al. |
| 5,482,988 A | 1/1996 | Ulman et al. |
| 5,490,690 A | 2/1996 | Mihm |
| 5,556,131 A | 9/1996 | Bender et al. |
| 5,566,977 A | 10/1996 | Wipasuramonton |
| 5,578,319 A | 11/1996 | Noel |
| 5,658,008 A | 8/1997 | Herrmann et al. |
| 5,782,489 A | 7/1998 | LaLonde et al. |
| 5,789,084 A | 8/1998 | Nakamura et al. |
| 5,810,388 A | 9/1998 | Berardi et al. |
| 5,863,625 A | 1/1999 | Chiou |
| 5,877,256 A | 3/1999 | Nakamura et al. |
| 5,909,895 A | 6/1999 | Iino et al. |
| 5,957,487 A | 9/1999 | Stutz et al. |
| 6,037,279 A | 3/2000 | Brookman et al. |
| 6,121,368 A | 9/2000 | Heying et al. |
| 6,155,595 A | 12/2000 | Schultz |
| 6,183,009 B1 | 2/2001 | Rychter et al. |
| 6,200,915 B1 | 3/2001 | Adams et al. |
| 6,210,519 B1 * | 4/2001 | Heudorfer et al. ............ 156/292 |
| 6,268,300 B1 | 7/2001 | Hernandez et al. |
| 6,354,620 B1 | 3/2002 | Budden et al. |
| 6,420,037 B1 | 7/2002 | Tsuji et al. |
| 6,454,301 B1 | 9/2002 | Rychter et al. |
| 6,465,552 B1 | 10/2002 | Chorvath et al. |
| 6,479,580 B1 | 11/2002 | Chorvath et al. |
| 6,503,984 B2 * | 1/2003 | Johnson et al. .................. 525/70 |
| 6,550,809 B1 * | 4/2003 | Masuda et al. ............. 280/743.1 |
| 6,562,180 B1 | 5/2003 | Bohin et al. |
| 6,562,907 B2 | 5/2003 | Johoji et al. |
| 6,585,293 B2 | 7/2003 | Keshavaraj et al. |
| 6,627,275 B1 | 9/2003 | Chen |
| 6,770,700 B2 * | 8/2004 | Mueller et al. ................. 524/494 |
| 6,773,030 B2 | 8/2004 | Fischer |
| 6,811,650 B2 | 11/2004 | Takuman et al. |
| 6,838,541 B2 | 1/2005 | Lin et al. |
| 6,886,857 B1 | 5/2005 | Mishina et al. |
| 6,926,792 B1 | 8/2005 | Valkenburg et al. |
| 6,979,022 B2 | 12/2005 | Smith et al. |
| 7,040,651 B2 | 5/2006 | Bossecker et al. |
| 7,138,447 B2 | 11/2006 | Saito et al. |
| 7,423,234 B2 | 9/2008 | Dumont et al. |
| 7,537,238 B2 | 5/2009 | Kanuma |
| 2002/0020992 A1 | 2/2002 | Kanuma |
| 2002/0149180 A1 | 10/2002 | Keshavaraj |
| 2002/0195808 A1 | 12/2002 | Chiou et al. |
| 2004/0222618 A1 | 11/2004 | Azechi et al. |
| 2004/0238114 A1 | 12/2004 | Lorenzo et al. |
| 2004/0245749 A1 | 12/2004 | Goujon |
| 2005/0003722 A1 | 1/2005 | James et al. |
| 2005/0023601 A1 | 2/2005 | Takeuchi et al. |
| 2005/0104349 A1 | 5/2005 | Stevens et al. |
| 2006/0046077 A1 | 3/2006 | Howe et al. |
| 2006/0205098 A1 | 9/2006 | Galland et al. |
| 2006/0237957 A1 * | 10/2006 | Woydick .................... 280/743.1 |
| 2006/0273558 A1 | 12/2006 | Breed et al. |
| 2006/0292650 A1 | 12/2006 | Braig et al. |
| 2006/0292949 A1 | 12/2006 | Guillo et al. |
| 2006/0292950 A1 | 12/2006 | Hill |
| 2007/0077397 A1 | 4/2007 | Saiz |
| 2007/0232750 A1 | 10/2007 | Iwata et al. |
| 2007/0261790 A1 | 11/2007 | Pouchelon et al. |
| 2009/0179410 A1 | 7/2009 | Schindzielorz |

FOREIGN PATENT DOCUMENTS

| | | |
|---|---|---|
| DE | 44 44 455 C1 | 2/1996 |
| DE | 198 52 232 A1 | 5/2000 |
| DE | 100 27 073 C1 | 8/2001 |
| DE | 102 02 715 A1 | 12/2002 |
| EP | 553840 A1 * | 8/1993 |
| EP | 0 393 426 B1 | 8/1994 |
| EP | 0 708 163 A2 | 10/1994 |
| EP | 0 663 468 A1 | 7/1995 |
| EP | 0 355 991 B1 | 8/1995 |
| EP | 0 851 817 B1 | 9/1996 |
| EP | 0 962 363 B1 | 5/1999 |
| EP | 1 035 161 A2 | 9/2000 |
| EP | 1 179 454 A2 | 8/2001 |
| EP | 1 736 378 B1 | 6/2006 |
| EP | 1 365 059 B1 | 5/2007 |
| EP | 1 519 793 B1 | 4/2008 |
| GB | 2169912 A | 7/1986 |
| GB | 2331955 A | 6/1999 |
| JP | 62-000527 A | 1/1987 |
| JP | 06-016099 A | 1/1994 |
| JP | 06-199198 | 7/1994 |
| JP | 11-227550 A | 8/1999 |
| JP | 2003-170802 A | 6/2003 |
| JP | 2003-289653 A | 10/2003 |
| JP | 2009-067372 | 9/2007 |
| WO | WO 98/36947 | 8/1998 |
| WO | WO 99/14082 | 3/1999 |
| WO | WO 99/42334 | 8/1999 |
| WO | WO 03/059994 A1 | 7/2003 |
| WO | WO 2004037941 A2 * | 5/2004 |
| WO | WO 2004/070102 A2 | 8/2004 |
| WO | WO 2004/109008 A1 | 12/2004 |
| WO | WO 2005/023601 A1 | 3/2005 |
| WO | WO 2006/083339 A1 | 8/2006 |
| WO | WO 2006/129887 A2 | 12/2006 |
| WO | WO 2007/070465 A2 | 6/2007 |
| WO | WO 2007/129777 A1 | 11/2007 |
| WO | WO 2007/135140 A1 | 11/2007 |
| WO | WO 2008/005293 A1 | 1/2008 |
| WO | WO2009-143090 A2 | 11/2009 |

OTHER PUBLICATIONS

English language translation and abstract for JP 11-227550 extracted from PAJ database Feb. 15, 2011, 26 pages.

PCT International Search Report PCT/US2009/044426, dated Mar. 5, 2010, 6 pages.

English language abstract and translation for JP 06-016099 extracted from the PAJ database on Jul. 5, 2012, 25 pages.

English language abstract for JP 62-000527 extracted from the espacenet.com database on Jul. 5, 2012, 19 pages.

English language abstract and translation for JP 2003-170802 extracted from the PAJ database on Jul. 5, 2012, 23 pages.

English language abstract and translation for JP 2003-289653 extracted from the PAJ database on Jul. 5, 2012, 53 pages.

JP 2002-166806, Nov. 6, 2002, Nippon Plastic Co. Ltd. Abstract only.

JP 03-054045, Aug. 3, 1991, Nitto Denko Corp. Abstract only.

JP 05-025435, Jan. 1, 1993, Toray Dow Corning Silicone Co Ltd. Abstract only.

JP 06-199198, Jul. 19, 1994, Toray Ind. Inc., et. al. Abstract only.

JP 10-102029, Apr. 21, 1998, Toagosei Co. Ltd. Abstract only.

JP 11-158380, Jun. 15, 1999, Dow Corning Toray Silicone Co. Ltd. Abstract only.

JP 2006-082443, Mar. 30, 2006, Dow Corning Toray Co. Ltd. Abstract only.

JP 2007-320511, Dec. 13, 2007, Nippon Plast. Co. Ltd. Abstract only.

Dow Corning InstantGlaze II Window Assembly Sealant, product information brochure, 2006.

Dow Corning Corporation InstantGlaze II Material Safety Data Sheet, 2005.

Dow Corning HM-2500 Assembly Sealant, product brochure, 2005.

* cited by examiner

"AIRBAG AND PROCESS FOR ITS ASSEMBLY"

CROSS REFERENCE TO RELATED APPLICATIONS

This application is a U.S. national stage filing under 35 U.S.C. §371 of PCT Application No. PCT/US07/021037 filed on 27 Sep. 2007, which claims the benefit of U.S. Provisional Patent Application No. 60/873,799 filed on 6 Dec. 2006 under 35 U.S.C. §119 (e). PCT Application No. PCT/US07/021037 and U.S. Provisional Patent Application No. 60/873,799 are hereby incorporated by reference.

BACKGROUND

1. Technical Field

The process and compositions described herein are useful for assembling airbags, which are useful in vehicle applications.

2. Problem to be Solved

Conventional airbags are made of coated woven fabrics. Panels forming the airbag and patches in the airbag are sewn together to provide sufficient mechanical strength. These airbags may be assembled by, for example, bonding a first panel and a second panel together with a silicone adhesive applied to the periphery of the panels and thereafter sewing the panels together with one or more seams of sewing thread. The seams are sewn through the silicone adhesive to provide sufficient gas imperviousness when the airbag is deployed. These properties result in a relatively time consuming and expensive process to assemble airbags, in which multiple steps are required to seal and sew seams. There is a need in the automotive industry to improve process efficiency for assembling airbags while maintaining other airbag properties.

SUMMARY

A process for assembling an airbag comprises forming a seam comprised of at least two different materials.

DETAILED DESCRIPTION

Definitions and Usage of Terms

All amounts, ratios, and percentages are by weight unless otherwise indicated. For purposes of this application, the articles 'a', 'an', and 'the' each refer to one or more. 'Airbag' means any inflatable article that can be filled with a gas such as air and that is useful to protect an occupant of a vehicle in the event of an impact.

Process for Assembling an Airbag

A process for forming a seam in an airbag involves at least two different materials. The materials may differ in hardness, modulus, or both. The materials may comprise a seam sealant and a hot melt adhesive. Alternatively, the materials may comprise two or more hot melt adhesives that differ in at least one of the following properties: modulus and elongation. Alternatively, the materials may comprise a seam sealant and a high consistency rubber (HCR). Without wishing to be bound by theory, it is thought that the material closest to the exterior of the airbag may have modulus at least 0.01% higher than the material closest to the interior of the airbag; the material closest to the exterior of the airbag may have a hardness at least 0.01% lower than the hardness of the material closest to the interior of the airbag; or both. Alternatively, when two hot melt adhesives are used, the hot melt adhesive closest to the exterior of the airbag may have an elongation at least 0.01% lower than the elongation of the hot melt adhesive closest to the interior of the airbag.

Figure 1:
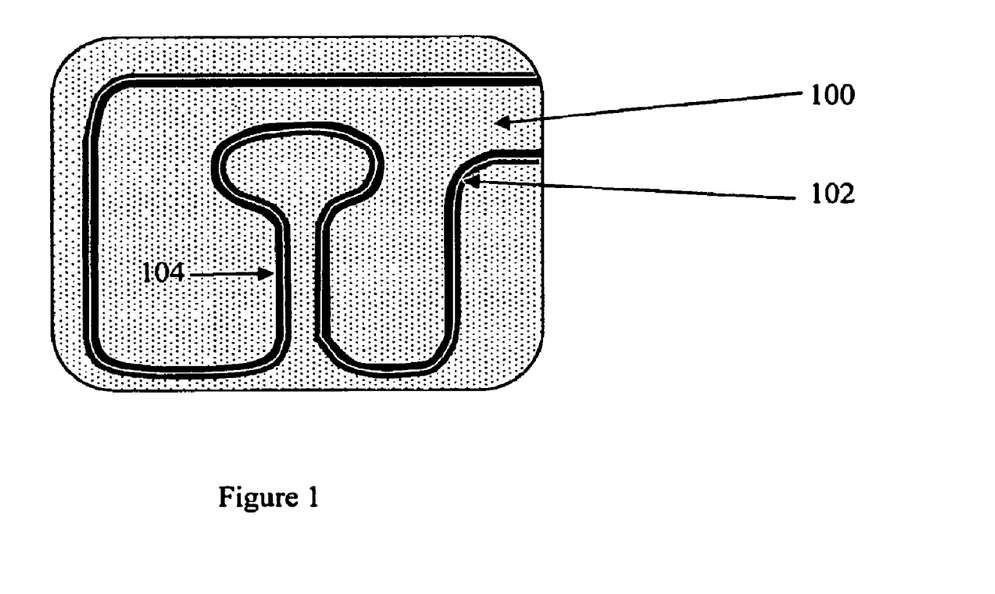
FIG. 1 shows an airbag prepared according to the methods of reference example 1 and 2 including a bead of seam sealant 104 and a bead of hot melt adhesive 102 between two coated fabric panels 100.
Figure 2:
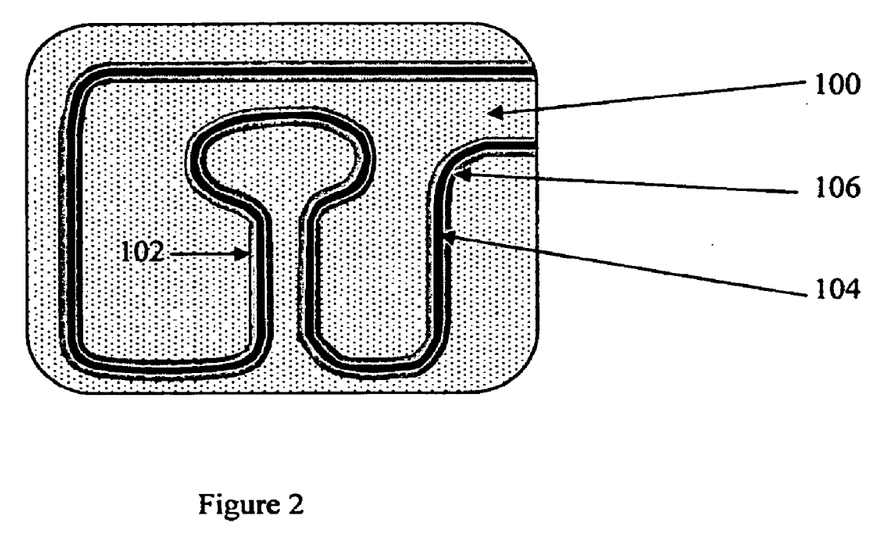
FIG. 2 is an alternative embodiment of an airbag including a second bead of hot melt adhesive 106.
Figure 3:
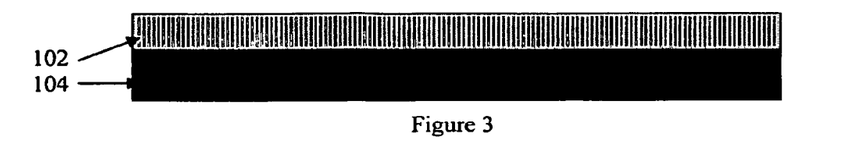
FIGS. 3-8 show examples of alternative configurations of materials in a seam.
Figure 4:
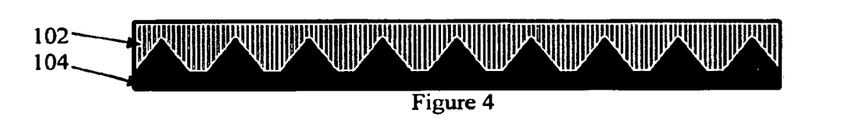
Figure 5:
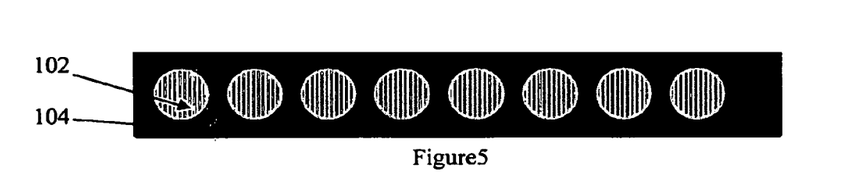
Figure 6:
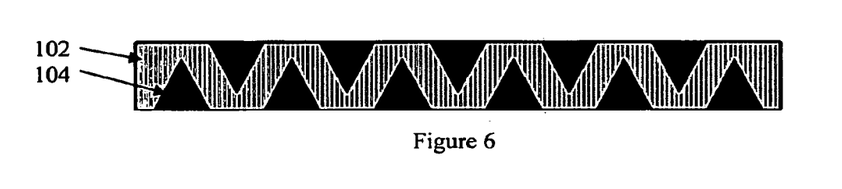
Figure 7:
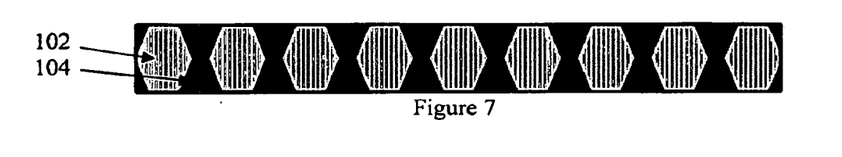
Figure 8:
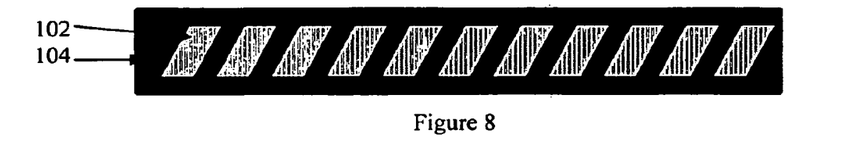

The materials contact one another to form the seam. The materials may have different configurations. FIGS. 3-8 show different configurations for the materials, for example, when a seam sealant and a hot melt adhesive are used. For example, a continuous, uniform bead of seam sealant 104 and a continuous, uniform bead of hot melt adhesive 102 may be juxtaposed around the perimeter of an airbag such that the bead of seam sealant is on the interior of an airbag and the bead of hot melt adhesive contacts the seam sealant on the exterior of the airbag, as shown in FIGS. 1 and 3. Alternatively, the bead of seam sealant 104 and the bead of hot melt adhesive 102 may be tapered such that more seam sealant is toward the interior of the bag and more hot melt adhesive is toward the exterior, as shown in FIG. 4. Alternatively, hot melt adhesive 104 may be segmented into discrete shapes, such as beads or rivets (FIG. 5) or squares, parallelograms (FIG. 8), or trapezoids, within a continuous bead of seam sealant 102, as shown in FIGS. 5 and 8. Alternatively, the seam sealant 104 may be discontinuous triangular sections surrounding a continuous zigzag shaped bead of hot melt adhesive 102, as shown in FIG. 6. Alternatively, the seam sealant 104 and the hot melt adhesive 102 may both be discontinuous, as shown in FIG. 7. Without wishing to be bound by theory, it is thought that a discontinuous hot melt adhesive (e.g., formed into discrete shapes) with either a continuous or discontinuous seam sealant may provide the advantage of improved foldability in some airbags as compared to a similar airbag with a continuous bead of hot melt adhesive. One skilled in the art would recognize that FIGS. 1-8 are exemplary and not limiting; for example, two different materials could be used (e.g., substituting a HCR for the hot melt adhesive 102 shown in FIGS. 1-8 or substituting a second hot melt adhesive for the seam sealant 104 in FIGS. 1-8). Furthermore, different configurations could be used than the configurations in FIGS. 3-8 or the configurations shown in FIGS. 3-8 could be modified by applying two compositions to the coated surface of one airbag component in a configuration shown in one of FIGS. 3-8 and thereafter putting a second airbag panel on top of the compositions in the process for assembling the airbag.

A process for assembling an airbag comprises:
1) applying a first composition to an airbag component,
2) applying a second composition to the same airbag component or a different airbag component, and
3) contacting the first composition and the second composition and forming a seam.

The seam comprises a first material made from the first composition and a second material made from the second composition. The first material is located toward the interior of the airbag, the second material is located toward the exterior of the airbag, and the first material and the second material contact each other.

The process may optionally further comprise applying an adhesion promoter, such as ingredient (V), described below, to the airbag component before applying the compositions. The adhesion promoter may be applied by any convenient means, such as dissolving or dispersing the adhesion promoter in a solvent, such as ingredient (VII) described below to form a solution and thereafter contacting with the solution, at least one surface of the airbag component to which one or both compositions will be applied. Applying the solution may be performed by, for example, by spraying, dipping, or brush coating.

The compositions may be applied to the airbag component by any convenient means, such as extrusion. The compositions may be applied concurrently or sequentially in any order. Alternatively, when a curable sealant composition and a hot melt composition are applied to the same airbag component in step 1), the curable sealant composition may be applied first, and thereafter the hot melt composition may be applied in contact with the curable sealant composition or spaced apart a small distance from the curable sealant composition. The exact distance may vary depending on the sealant composition and hot melt composition selected; however, the distance is sufficiently small that the hot melt adhesive and seam sealant are in contact with one another after step 4). In one embodiment, there are no gaps between the seam sealant and the hot melt adhesive. For example, the curable sealant composition may be applied as a first continuous uniform bead, and the hot melt composition may be applied as a second continuous uniform bead; and the seam sealant and hot melt adhesive form one bead after step 4). The exact configurations of the first and second continuous uniform beads will depend on various factors including the specific airbag design selected. However, the width of the bead of curable sealant composition is sufficient to provide a bead of seam sealant that may range from 6 millimeters (mm) to 12 mm, alternatively 6 to 10 mm. The depth of the bead of curable sealant composition is sufficient to provide a bead of seam sealant that may range from 0.5 mm to 1 mm, alternatively 0.6 mm to 0.8 mm. The bead of hot melt adhesive may have the same dimensions as the bead of seam sealant.

The process may further comprise applying a second airbag component to the curable sealant composition and the hot melt composition before step 4), for example, when the curable sealant composition and the hot melt composition are applied to the same airbag component in steps 1) and 2). Applying the second airbag component may cause the bead of curable sealant composition and the bead of hot melt composition to contact each other, if the beads were spaced apart from one another during application. Applying the second airbag component may be performed by any convenient means. For example, a first panel having a first coated surface may be used in step 1), and a second panel having a second coated surface may be used in step 2), where the curable sealant composition and hot melt composition contact the coated surfaces of the panels.

Alternatively, one skilled in the art would recognize that the curable sealant composition may be applied to a first surface of a first airbag component and the hot melt composition may be applied to a second surface of a second airbag component. Thereafter, the first and second airbag components may be combined such that the curable sealant composition and the hot melt composition contact each other.

Alternatively, the curable sealant composition may be applied to a first airbag component, such as a bottom panel, in step 1); and the hot melt composition may be applied to a second airbag component, such as a top panel, in step 2). The process may further comprise optionally cooling the hot melt composition before step 3). Without wishing to be bound by theory, it is thought that allowing the hot melt to cool may aid in the compressing of the hot melt composition into the curable sealant composition, forcing the lower viscosity curable sealant composition away from the surface of the bottom panel. This process can be applicable regardless of the configuration of the hot melt distribution whether it is continuous (e.g., straight, curved or zigzag) or as segmented shapes (such as beads).

After step 2), the top panel is oriented to the bottom panel and compressed to a thickness that may range from 0.5 mm to 1.2 mm, to improve contact between compositions and coated surfaces of the airbag components.

Application of the hot melt in a segmented pattern, for example, as shown in FIGS. 5-8, may be performed by applying the hot melt composition first, cooling it, and thereafter placing the curable sealant composition over the hot melt adhesive prepared by cooling the hot melt composition. Alternatively, a hot melt adhesive prepared by cooling the hot melt composition may be formed into discrete shapes such as beads and the beads may be inserted into the curable sealant composition. The contacting step would then push the beads of hot melt adhesive through the curable sealant composition and provide contact on both surfaces of the airbag components.

The process may optionally further comprise applying a third composition to the airbag component before step 3). For example, when the first composition is a curable sealant composition, the second composition is a hot melt composition, a second bead of hot melt composition may be applied to the airbag component before step 3) and before applying the second airbag component. The second bead of hot melt composition may be a different hot melt composition than the hot melt composition applied in step 2). For example, the curable sealant composition (interior), first bead of hot melt composition (which cures to form a first hot melt adhesive having a first modulus and a first elongation), and second bead of hot melt composition (which cures to form a second hot melt adhesive having a higher modulus, a lower elongation, or both, as compared to the first hot melt adhesive) may be used. Alternatively, the bead of seam sealant can be surrounded by hot melt adhesive beads on either side.

The process may further comprise cooling the hot melt composition after it is applied to the airbag component. Without wishing to be bound by theory, it is thought that cooling the hot melt composition may improve green strength of the airbag, thereby allowing for reducing assembly time and cost. When a noncurable hot melt composition is used, cooling may be performed to form the hot melt adhesive.

Step 3) may be performed by compressing the airbag components to form a compressed article. For example, the airbag components may be compressed between plates of a press at 1 to 500 psig, alternatively 100 to 300 psig. The compressed article may be contacted with a heated substrate, such as a hot plate, at a temperature ranging from 70° C. to 200° C., alternatively 70° C. to 120° C. and allowing one surface of the compressed article to contact the hot plate for a time ranging from 90 seconds (s) to 600 s when a curable composition is used to prepare one or more of the materials. For example, curing the curable sealant composition to form a seam sealant may be performed by heating on a hot plate at a temperature of 70° C. to 200° C. for 3 minutes to 5 minutes. Alternatively, when the hot melt composition is contacted with the curable sealant composition, heat from the hot melt composition may initiate cure of the curable sealant composition. Without wishing to be bound by theory, it is thought that these methods of heating provide a benefit of reducing bubble formation thereby improving contact of the seam sealant and hot melt adhesive with the air bag component, as compared to heating methods involving heating all sides at once, for example, by placing the compressed article in an oven.

The process may optionally further comprise curing the hot melt composition, when a curable hot melt composition is used. For example, the hot melt composition may cure by exposure to heat at conditions such as those described above, when a hydrosilylation reaction curable hot melt composition or peroxide curable hot melt composition is used, or exposure to moisture present as humidity in ambient air, when a condensation reaction curable hot melt composition is used.

The process may optionally further comprise post curing the airbag. For example, the airbag may be compressed, for example between hot plates at temperatures ranging from 90° C. to 185° C., alternatively 90° C. to 125° C. for 30 seconds to 5 minutes, alternatively 30 seconds to 90 seconds. The pressure may vary from 1 psig to 500 psig, alternatively 100 to 300 psig. Without wishing to be bound by theory, it is thought that if pressure is too high in the post curing step, pressure retention may decrease when the airbag is deployed. Without wishing to be bound by theory, it is thought that when a seam sealant is used, the seam sealant acts as a cushion during compression and allows a curable hot melt composition or HCR composition to reach a fully or partially cured state.

The process may be used to form seams on airbags that are peripheral seams, interior seams, or both. Alternatively, the process may be used to form peripheral seams (seam around the periphery) on airbags. The process described herein employing both the seam sealant and the hot melt adhesive may eliminate the need for sewing one or more of the seams. For example, the process of this invention may be used to prepare a peripheral seam to form the bag while an interior seam, for example to form compartments within the airbag, may be sewn.

Seam Sealant

The curable sealant composition used in the process described above may be a hydrosilylation reaction curable polyorganosiloxane composition. Examples of such compositions are known in the art. For example, U.S. Pat. No. 6,811,650, which is hereby incorporated by reference, discloses a composition suitable for use as the curable sealant composition in the process described above. Alternatively, commercially available seam sealants may be used, and examples include DOW CORNING® SE 6711, SE 6750, and SE 6777, which are commercially available from Dow Corning Corporation of Midland, Mich., U.S.A.

Alternatively, the curable sealant composition may be a curable polyorganosiloxane composition which is flowable at 25° C. and which cures to form an elastomer upon heating. An exemplary hydrosilylation reaction curable polyorganosiloxane composition comprises:

(A) a polyorganosiloxane having an average, per molecule, of at least two organic groups having terminal aliphatic unsaturation;
(B) a crosslinker having an average per molecule of at least two silicon-bonded hydrogen atoms;
(C) a filler; and
(D) a hydrosilylation catalyst.

Ingredient (A) Polyorganosiloxane with Aliphatic Unsaturation

Ingredient (A) is a polyorganosiloxane having an average, per molecule, of at least two organic groups having terminal aliphatic unsaturation. The aliphatically unsaturated organic groups in ingredient (A) may be alkenyl exemplified by, but not limited to, vinyl, allyl, butenyl, pentenyl, and hexenyl, alternatively vinyl. The aliphatically unsaturated organic groups may be alkynyl groups exemplified by, but not limited to, ethynyl, propynyl, and butynyl. The aliphatically unsaturated organic groups in ingredient (A) may be located at terminal, pendant, or both terminal and pendant positions. The remaining silicon-bonded organic groups in ingredient (A) may be other monovalent hydrocarbon groups, which may be substituted or unsubstituted. Monovalent unsubstituted hydrocarbon groups are exemplified by, but not limited to alkyl groups such as methyl, ethyl, propyl, pentyl, octyl, undecyl, and octadecyl; aromatic groups such as ethylbenzyl, naphthyl, phenyl, tolyl, xylyl, benzyl, styryl, 1-phenylethyl, and 2-phenylethyl, alternatively phenyl; and cycloalkyl groups such as cyclohexyl. Monovalent substituted hydrocarbon groups are exemplified by, but not limited to halogenated alkyl groups such as chloromethyl, 3-chloropropyl, and 3,3, 3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl.

Ingredient (A) may have unit formula (I): $(R^1SiO_{3/2})_a (R^1{}_2SiO_{2/2})_b(R^1{}_3SiO_{1/2})_c(SiO_{4/2})_d(XO_{1/2})_e$. In this formula, each $R^1$ is independently an aliphatically unsaturated organic group or a monovalent hydrocarbon group as described above, with the proviso that on average at least two $R^1$ per molecule are aliphatically unsaturated organic groups. X is a hydrogen atom or a monovalent hydrocarbon group, subscript a is 0 or a positive number, subscript b is a positive number, subscript c is 0 or a positive number, subscript d is 0 or a positive number, and subscript e is 0 or a positive number.

Ingredient (A) may comprise a polydiorganosiloxane of general formula (II): $R^1{}_3SiO—(R^1{}_2SiO)_f—SiR^1{}_3$, where $R^1$ is as described above, and subscript f is an integer having a value sufficient to provide ingredient (A) with a viscosity ranging from 100 to 1,000,000 mPa·s at 25° C. Alternatively, formula (II) is an α, ω-dialkenyl-functional polydiorganosiloxane such as dimethylvinylsiloxy-terminated polydimethylsiloxane.

Ingredient (A) is exemplified by dimethylvinylsiloxy-terminated polydimethylsiloxane, trimethylsiloxy-terminated, poly(dimethylsiloxane/methylvinylsiloxane), and polyorganosiloxanes comprising siloxane units of the formulae $(CH_3)_3SiO_{1/2}$, $(CH_3)_2CH_2=CHSiO_{1/2}$, and $SiO_{4/2}$. Ingredient (A) can be one polyorganosiloxane or a combination comprising two or more polyorganosiloxanes that differ in at least one of the following properties: structure, viscosity, average molecular weight, siloxane units, and sequence. The composition may contain 100 parts by weight of ingredient (A).

Ingredient (B) Crosslinker

Ingredient (B) is a crosslinker having an average, per molecule, of more than two silicon bonded hydrogen atoms. Ingredient (B) may have unit formula (III): $(R^2SiO_{3/2})_h (R^2{}_2SiO_{2/2})_i(R^2{}_3SiO_{1/2})_j(SiO_{4/2})_k(XO)_m$, where each $R^2$ is independently a hydrogen atom or a monovalent substituted or unsubstituted hydrocarbon group as exemplified above, X is as described above, subscript h is a positive number, subscript i is a positive number, subscript j is 0 or a positive number, subscript k is 0 or a positive number, and subscript m is 0 or a positive number.

Ingredient (B) may comprise a polydiorganohydrogensiloxane of general formula (IV): $HR^3{}_2SiO—(R^3{}_2SiO)_g—$ $SiR^3{}_2H$, where each $R^3$ is independently a hydrogen atom or a monovalent substituted or unsubstituted hydrocarbon group as exemplified above, and subscript g is an integer with a value of 1 or more. Alternatively, ingredient (B) may comprise hydrogen-terminated dimethylsiloxane, trimethylsiloxy-terminated poly(dimethyl/methylhydrogen siloxane), or a combination thereof.

Ingredient (B) can be one crosslinker or a combination comprising two or more crosslinkers that differ in at least one of the following properties: structure, viscosity, average molecular weight, siloxane units, and sequence. The amount of ingredient (B) may be selected such that the molar ratio of silicon bonded hydrogen atoms to aliphatically unsaturated organic groups ranges from 1:100 to 20:1 in this composition.

Ingredient (C) Filler

Ingredient (C) is a filler. Ingredient (C) may comprise a reinforcing filler, an extending filler, or a combination thereof. The reinforcing filler may be added in an amount ranging from 5 to 200 parts based on 100 parts of ingredient (A). Examples of suitable reinforcing fillers include reinforcing silica fillers such as fume silica, silica aerogel, silica zerogel, and precipitated silica. Fumed silicas are known in the art and commercially available; a fumed silica is sold under the name CAB-O-SIL by Cabot Corporation of Massachusetts, U.S.A.

The extending filler may be added to the composition in an amount ranging from 5 to 200 parts based on 100 parts of ingredient (A). Examples of extending fillers include glass beads, quartz, aluminum oxide, magnesium oxide, calcium carbonate, zinc oxide, talc, diatomaceous earth, iron oxide, clays, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, W. Va., U.S.A.

Ingredient (D) Hydrosilylation Catalyst

Ingredient (D) is a hydrosilylation catalyst Ingredient (D) is added in an amount sufficient to promote curing of the composition. The exact amount depends on the specific catalyst selected; however, ingredient (D) may be added in an amount sufficient to provide 0.01 to 500 ppm of platinum group metal, based on 100 parts of ingredient (A).

Suitable hydrosilylation catalysts are known in the art and commercially available. Ingredient (D) may comprise a platinum group metal selected from the group consisting of platinum, rhodium, ruthenium, palladium, osmium or iridium metal or organometallic compound thereof, and a combination thereof. Ingredient (D) is exemplified by platinum black, compounds such as chloroplatinic acid, chloroplatinic acid hexahydrate, a reaction product of chloroplatinic acid and a monohydric alcohol, platinum bis-(ethylacetoacetate), platinum bis-(acetylacetonate), platinum dichloride, and complexes of said compounds with olefins or low molecular weight polyorganosiloxanes or platinum compounds microencapsulated in a matrix or coreshell type structure. Complexes of platinum with low molecular weight polyorganosiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum. When the catalyst is a platinum complex with a low molecular weight polyorganosiloxane, the amount of catalyst may range from 0.02 to 0.2 parts based on the weight of the composition.

Suitable hydrosilylation catalysts for ingredient (D) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are also known in the art, as exemplified in U.S. Pat. Nos. 4,766,176; and 5,017,654.

The hydrosilylation curable polyorganosiloxane composition described above may further comprise an additional ingredient selected from the group consisting of (E) a filler treating agent, (F) an adhesion promoter, (G) a pigment, (H) a cure modifier, (J) a nonreactive resin, and a combination thereof, provided however that any additional ingredients and amounts added do not render the composition incapable of curing to form an elastomer suitable for use in an airbag.

Ingredient (E) Filler Treating Agent

The composition may optionally further comprise ingredient (E), a filler treating agent in an amount ranging from 0 to 1 part based on 100 parts of ingredient (A). Ingredient (C) may optionally be surface treated with ingredient (E). Ingredient (C) may be treated with ingredient (E) before being added to the composition, or in situ. Ingredient (E) may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, a stearate, or a fatty acid. Examples of silanes include hexamethyldisilazane. Examples of stearates include calcium stearate. Examples of fatty acids include stearic acid, oleic acid, palmitic acid, tallow, coco, and combinations thereof. Examples of filler treating agents and methods for their use are disclosed in, for example, EP 1 101 167 A2 and U.S. Pat. Nos. 5,051,455, 5,053,442, and 6,169,142 (col. 4, line 42 to col. 5, line 2).

Ingredient (F) Adhesion Promoter

Ingredient (F) is an adhesion promoter, as described below for ingredient (V). Ingredient (F) may be added in an amount ranging from 0.01 to 10 parts based on 100 parts of ingredient (A).

Ingredient (G) Pigment

Ingredient (G) is a pigment. Examples of suitable pigments include iron (III) oxide, titanium dioxide, or a combination thereof. Ingredient (G) may be added in an amount ranging from 0 to 0.5 parts based on the 100 parts of ingredient (A).

Ingredient (H) Cure Modifier

Ingredient (H) is a cure modifier. Ingredient (H) can be added to extend the shelf life or working time, or both, of the hydrosilylation curable polyorganosiloxane composition. Ingredient (H) can be added to raise the curing temperature of the composition. Ingredient (H) may be added in an amount ranging from 0.01 to 5 parts based on 100 parts of ingredient (A).

Suitable cure modifiers are known in the art and are commercially available. Ingredient (H) is exemplified by acetylenic alcohols, alkyl alcohols, cycloalkenylsiloxanes, enyne compounds, triazoles, phosphines, mercaptans, hydrazines, amines, fumarates, maleates, and combinations thereof.

Examples of acetylenic alcohols are disclosed, for example, in EP 0 764 703 A2 and U.S. Pat. No. 5,449,802 and include methyl butynol, ethynyl cyclohexanol, dimethyl hexynol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and combinations thereof.

Examples of alkyl alcohols include ethanol, isopropanol, or combinations thereof.

Examples of cycloalkenylsiloxanes include methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and combinations thereof. Examples of ene-yne compounds include 3-methyl-3-penten-1-yne, 3,5-dimethyl-3-hexen-1-yne, and combinations thereof. Examples of triazoles include benzotriazole. Examples of phosphines include triphenylphosphine. Examples of amines include tetramethyl ethylenediamine. Examples of fumarates include dialkyl fumarates, dialkenyl fumarates, dialkoxyalkyl fumarates, and combinations thereof. Suitable cure modifiers are disclosed by, for example, U.S. Pat. Nos. 3,445,420; 3,989,667; 4,584,361; and 5,036,117.

Alternatively, ingredient (H) may comprise a silylated acetylenic inhibitor. A silylated acetylenic inhibitor is a reaction product of a silane and an acetylenic alcohol, described above. Examples of silylated acetylenic inhibitors and methods for their preparation are disclosed, for example, in EP 0 764 703 A2 and U.S. Pat. No. 5,449,802.

Ingredient (J) Nonreactive Resin

Ingredient (J) is a resin that may be added in addition to or instead of the filler. Nonreactive means that the resin does not participate in the curing reaction with ingredients (A) or (B). The nonreactive resin may be a polyorganosiloxane comprising siloxane units of the formulae $(CH_3)_3SiO_{1/2}$ and $SiO_{4/2}$ (MQ resin). Ingredient (J) may be added in an amount ranging from 0 to 30 based on 100 parts of ingredient (A).

The curable sealant composition may be prepared as a one-part composition or as a multiple part composition. In a multiple part composition, such as a two-part composition, ingredients (B) and (D) are stored in separate parts, which are combined shortly before step 1 in the process described above.

Hot Melt Adhesive

Commercially available hot melt adhesives may be used in the process described above. Examples of suitable hot melt compositions used to prepare the hot melt adhesives include moisture curable hot melt compositions and polyurethane hot melt compositions, which are commercially available from National Starch of New Jersey, U.S.A. Examples of suitable hot melt compositions used to prepare hot melt adhesives include DOW CORNING® HM 2500 and HM 2510, which are commercially available from Dow Corning Corporation of Midland, Mich., U.S.A. The hot melt composition suitable for use in the process may not be flowable at 25° C. but may be flowable at temperatures ranging from 50° C. to 150° C., alternatively 70° C. to 130° C. The hot melt composition may be noncurable, e.g., the hot melt composition is fluid when heated and forms a hot melt adhesive upon cooling without needing a curing reaction to form the hot melt adhesive. Examples of noncurable hot melt compositions and methods for their preparation are disclosed, for example, in U.S. Pat. Nos. 5,352,722; 5,578,319; 5,482,988; 5,328,696; and 5,371,128. Alternatively, the hot melt composition may be a hydrosilylation reaction curable composition, a condensation reaction curable composition, or a combination thereof. Examples of hydrosilylation curable hot melt compositions are disclosed, for example, in U.S. Pat. Nos. 5,248,739 and 6,121,368, and EP 1035161A2. Examples of condensation reaction curable hot melt compositions and methods for their preparation are disclosed, for example, in WO 2004/037941.

The hot melt composition may be a condensation reaction curable polyorganosiloxane composition which is not flowable at 25° C. but is flowable at temperatures ranging from 50° C. to 150° C., alternatively 70° C. to 130° C. An exemplary condensation reaction curable polyorganosiloxane composition comprises:

(I) a polyorganosiloxane resin,
(II) a polyorganosiloxane having an average, per molecule, of at least two silicon bonded hydrolyzable groups, and
(III) a silane crosslinker.

Ingredient (I) Polyorganosiloxane Resin

A polyorganosiloxane resin useful herein has unit formula (V): $(R^4SiO_{3/2})_n(R^4{}_2SiO_{2/2})_o(R^4{}_3SiO_{1/2})_p(SiO_{4/2})_q(X')_r$. Each $R^4$ represents a substituted or unsubstituted monovalent hydrocarbon group as exemplified above, and X' is hydrolyzable group or an organic group having terminal aliphatic unsaturation, such as an alkenyl group. Suitable hydrolyzable groups for X' include a hydroxyl group; an alkoxy group such as methoxy and ethoxy; an alkenyloxy group such as isopropenyloxy; a ketoximo group such as methyethylketoximo; a carboxy group such as acetoxy; an amidoxy group such as acetamidoxy; and an aminoxy group such as N,N-dimethylaminoxy. Subscript n is 0 or a positive number, subscript o is 0 or a positive number, subscript p is 0 or a positive number, subscript q is 0 or a positive number, and subscript r is 0 or greater, alternatively r is at least 2. The quantity (p+q) is 1 or greater, and the quantity (n+o) is 1 or greater.

The polyorganosiloxane resin is soluble in liquid organic solvents such as liquid hydrocarbons exemplified by benzene, toluene, xylene, heptane and in liquid organosilicon compounds such as a low viscosity cyclic and linear polydiorganosiloxanes. The polyorganosiloxane resin may comprise amounts $R^4{}_3SiO_{1/2}$ and $SiO_{4/2}$ units in a molar ratio ranging from 0.5/1 to 1.5/1, alternatively from 0.6/1 to 0.9/1. These molar ratios are conveniently measured by $Si^{29}$ nuclear magnetic resonance (n.m.r.) spectroscopy.

The number average molecular weight, $M_n$, to achieve desired flow characteristics of the polyorganosiloxane resin will depend at least in part on the molecular weight of the polyorganosiloxane resin and the type(s) of hydrocarbon group, represented by $R^4$, that are present in this ingredient. $M_n$ as used herein represents the molecular weight measured using gel permeation chromatography, when the peak representing the neopentamer is excluded form the measurement. The $M_n$ of the polyorganosiloxane resin is may be greater than 3,000, alternatively $M_n$ may range from 4500 to 7500.

The polyorganosiloxane resin can be prepared by any suitable method. Such resins may be prepared by cohydrolysis of the corresponding silanes or by silica hydrosol capping methods known in the art. For example, the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310 may be used.

The intermediates used to prepare the resin may be triorganosilanes of the formula $R^4{}_3SiX''$, where X'' represents a hydrolyzable group, and either a silane with four hydrolyzable groups such as halogen, alkoxy or hydroxyl, or an alkali metal silicate such as sodium silicate.

It may be desirable that the silicon-bonded hydroxyl groups (e.g., $HOR^4{}_2SiO_{1/2}$ or $HOSiO_{3/2}$ groups) in the polyorganosiloxane resin be below 0.7% of the weight of the resin, alternatively below 0.3%. Silicon-bonded hydroxyl groups formed during preparation of the resin may be converted to trihydrocarbylsiloxy groups or a hydrolyzable group by reacting the resin with a silane, disiloxane or disilazane containing the appropriate terminal group. Silanes containing hydrolyzable groups are typically added in excess of the quantity required to react with the silicon-bonded hydroxyl groups of the resin.

Ingredient (I) can be one polyorganosiloxane resin or a combination comprising two or more polyorganosiloxane resins that differ in at least one of the following properties: structure, viscosity, average molecular weight, siloxane units, and sequence. The amount of ingredient (I) added may range from 55 to 75 parts based on the weight of the composition.

Ingredient (II) Hydrolyzable Polyorganosiloxane

The polyorganosiloxane useful herein is comprised of difunctional units of the formula $R^5R^6SiO$ and terminal or branching units of the formula $R^7{}_sX^3{}_{3-s}SiG$- wherein $R^5$ is an alkoxy group or a monovalent unsubstituted or substituted hydrocarbon group, such as an alkyl group or an alkenyl group; $R^6$ is a unsubstituted or substituted monovalent hydrocarbon group; $R^7$ is aminoalkyl or $R^4$ group $X^3$ is a hydrolyzable group; G is a divalent group linking the silicon atom of the terminal unit with another silicon atom and subscript s is 0 or 1. The polyorganosiloxane can optionally contain up to about 20 percent, based on total of trifunctional units of the formula $R^6SiO_{3/2}$ where $R^6$ is as described previously. At least 50 percent, alternatively at least 80 percent, of the radicals represented by $R^5$ and $R^6$ in the $R^5R^6SiO$ units may be alkyl groups of 1 to 6 carbon atoms, such as methyl.

The terminal units present on the polyorganosiloxane are represented by the formula $R^7{}_sX^3{}_{3-s}SiG$-, where $X^3$, $R^7$, G, and subscript s are as described above. Examples of hydrolyzable groups represented by $X^3$ include but are not limited to hydroxy, alkoxy such as methoxy and ethoxy, alkenyloxy such as isopropenyloxy, ketoximo such as methyethylketoximo, carboxy such as acetoxy, amidoxy such as acetamidoxy and aminoxy such as N,N-dimethylaminoxy.

In the terminal groups when s is 0 the groups represented by $X^3$ can be alkoxy, ketoximo, alkenyloxy, carboxy, aminoxy or amidoxy. When s is 1, $X^3$ can be alkoxy and $R^7$ can be alkyl such as methyl or ethyl, or aminoalkyl such as aminopropyl or 3-(2-aminoethylamino)propyl. The amino portion of the aminoalkyl radical can be primary, secondary or tertiary.

In the formula for the terminal unit G is a divalent group or atom that is hydrolytically stable. By hydrolytically stable it is meant that it is not hydrolyzable and links the silicon atom(s) of the terminal unit to another silicon atom in the polyorganosiloxane such that the terminal unit is not removed during curing of the composition and the curing reaction is not adversely affected. Hydrolytically stable linkages represented by G include but are not limited to an oxygen atom, a hydrocarbylene group such as alkylene and phenylene, a hydrocarbylene containing one or more hetero atoms selected from oxygen, nitrogen and sulfur, and combinations of these linking groups. G can represent a silalkylene linkage such as —(OSiMe$_2$)CH$_2$CH$_2$—, —(CH$_2$CH$_2$SiMe$_2$)(OSiMe$_2$)CH$_2$CH$_2$—, —(CH$_2$CH$_2$SiMe$_2$)O—, (CH$_2$CH$_2$SiMe$_2$)OSiMe$_2$)O—, —(CH$_2$CH$_2$SiMe$_2$)CH$_2$CH$_2$— and —CH$_2$CH$_2$—, a siloxane linkage such as —(OSiMe$_2$)O—.

Specific examples of preferred terminal units include, but are not limited to, (MeO)$_3$SiCH$_2$CH$_2$—, (MeO)$_3$SiO—, Me(MeO)$_2$SiO—, H$_2$NCH$_2$CH$_2$N(H)(CH$_2$)$_3$SiO—, (EtO)$_3$SiO—, (MeO)$_3$SiCH$_2$CH$_2$Si(Me$_2$)OSi(Me$_2$)CH$_2$CH$_2$—, (MeO)$_3$SiCH$_2$CH$_2$Si(Me$_2$)OSi(Me$_2$)CHCH$_3$—, Me$_2$NOSiO—, MeC(O)N(H)SiO— and CH$_2$=C(CH$_3$)OSiO—. Me in these formulae represents methyl, and Et represents ethyl.

When $X^3$ contains an alkoxy group, it may be desirable to separate this $X^3$ group from the closest siloxane unit by an alkylene radical such as ethylene. In this instance, $R^7{}_sX^3{}_{3-s}SiG$- could be (MeO)$_3$SiCH$_2$CH$_2$Si(Me$_2$)O—. Methods for converting hydroxyl groups to trialkoxysilylalkyl groups are known in the art. For example, moisture reactive groups having the formulae (MeO)$_3$SiO— and Me(MeO)$_2$SiO— can be introduced into a silanol-terminated polyorganosiloxane by compounds having the formulae (MeO)$_4$Si and Me(MeO)$_3$Si, respectively. Alternatively, compounds having the formulae (MeO)$_3$SiH and Me(MeO)$_2$SiH, respectively, can be used when the polyorganosiloxane contains silanol groups or aliphatically unsaturated organic groups such alkenyl groups, e.g., vinyl and a hydrosilylation reaction catalyst such as those described above for ingredient (D). It will be understood that other hydrolyzable groups such as dialkylketoximo, alkenyloxy and carboxy can replace the alkoxy group.

The viscosity of the polyorganosiloxane may range from 0.02 Pa·s to 100 Pa·s at 25° C., alternatively 0.35 Pa·s to 60 Pa·s. Ingredient (II) can be one polyorganosiloxane or a combination comprising two or more polyorganosiloxanes that differ in at least one of the following properties: structure, viscosity, average molecular weight, siloxane units, and sequence. The amount of ingredient (II) added may range from 25 to 45 parts based on the weight of the composition.

Ingredients (I) and (II) are present in amounts sufficient to provide 55% to 75% resin solids based on the combined amounts of ingredients (I) and (II). Higher amounts of resin can be used however, higher application temperatures may be needed to apply the moisture curable hot melt composition to a substrate.

Ingredient (III) Silane Crosslinker

The silane crosslinker is represented by the formula $R^4{}_tSiZ_{(4-t)}$, where $R^4$ is as described previously and Z is a hydrolyzable group that reacts with the terminal groups of at least the polyorganosiloxane under ambient conditions to form a cured material and t is 0, 1 or 2. Suitable hydrolyzable groups represented by Z include but are not limited to alkoxy containing from 1 to 4 carbon atoms, carboxy such as acetoxy, ketoximo such as methylethylketoximo and aminoxy. When t is 2 in the silane crosslinker, the polyorganosiloxane may contain three $X^3$ groups (e.g., s is 0).

Suitable silane crosslinkers include but are not limited to methyltrimethoxysilane, isobutyltrimethoxysilane, methyltris(methylethylketoximo)silane, methyltriethoxysilane, isobutyltriethoxysilane, methyltriacetoxysilane and alkyl orthosilicates such as ethyl orthosilicate.

The amount of silane crosslinker used may range from 0 to 15 parts per hundred (pph), alternatively 0.5 to 15 pph based on the amount of ingredients (I) and (II). Without wishing to be bound by theory, it is thought that if too much silane crosslinker is present, the green strength and/or cure rate of the hot melt composition will decrease. If the silane crosslinker is volatile it may be necessary to use an excess amount during processing to achieve the 0.5 to 15 pph in the final hot melt composition. One skilled in the art will be able to determine the amount need to produce a hot melt composition with 1.5 to 15 pph.

Optional Ingredients

The condensation reaction curable hot melt composition may optionally further comprise one or more additional ingredients. The additional ingredients are exemplified by (IV) a condensation reaction catalyst, (V) an adhesion promoter, (VI) a filler, (VII) a solvent, (VIII) a bodied resin, (IX) a polyorganosiloxane wax, (X) an organic resin, or a combination thereof.

Ingredient (IV) Condensation Reaction Catalyst

A condensation reaction catalyst may be added to the hot melt composition. Ingredient (IV) may comprise a carboxylic acid salt of metal, a tin compound, a titanium compound, or a zirconium compound. Ingredient (IV) may comprise carboxylic acid salts of metals, ranging from lead to manganese inclusive, in the electromotive series of metals. Alternatively, ingredient (IV) may comprise a chelated titanium compound, a titanate such as a tetraalkoxytitanate, an organotitanium compound such as isopropyltitanate, tetra tert butyl titanate and partially chelated derivatives thereof with chelating agents such as acetoacetic acid esters and beta-diketones or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis-(ethoxyacetoacetonate)diisopropoxy titanium (IV), and a combination thereof. Alternatively ingredient (IV) may comprise a tin compound such as dibutyltin diacetate, dibutyltin dilaurate, dibutyl tin oxide, stannous octoate tin oxide, or a combination thereof. Examples of catalysts are disclosed in U.S. Pat. Nos. 4,962,076; 5,051,455; and 5,053,442. The amount of catalyst may range from 0.01 to 2 pph based on the amount of ingredients (I) and (II). Without wishing to be bound by theory, it is thought that if too much catalyst is added, then the cure of the hot melt composition will be impaired. Additionally, as the amount of catalyst is increased the viscosity of the hot melt composition may increase, resulting in higher melt temperature required to apply the hot melt composition.

Ingredient (V) Adhesion Promoter

The hot melt composition may optionally further comprise an adhesion promoter in an amount ranging from 0.05 to 2 pph based on the combined weights of ingredients (I) and (II). Adhesion promoters are known in the art, and may comprise an alkoxysilane, a combination of an alkoxysilane with a transition metal chelate, a combination of an alkoxysilane with a hydroxy-functional polyorganosiloxane, or a partial hydrolyzate of an alkoxysilane. Suitable alkoxysilanes may have the formula $R^8{}_u R^9{}_v Si(OR^{10})_{4-(u+v)}$ where each $R^8$ and each $R^{10}$ are independently substituted or unsubstituted, monovalent hydrocarbon groups having at least 3 carbon atoms, and $R^9$ contains at least one SiC bonded organic group having an adhesion-promoting group, such as alkenyl, amino, epoxy, mercapto or acrylate groups, subscript u has the value of 0 to 2, subscript v is either 1 or 2, and the quantity (u+v) is not greater than 3. The adhesion promoter can also be a partial condensate of the above silane.

Examples of suitable adhesion promoters are exemplified by (epoxycyclohexyl)ethyldimethoxysilane, (epoxycyclohexyl)ethyldiethoxysilane, allyltrimethoxysilane, allyltriethoxysilane, aminopropyltrimethoxysilane, aminopropyltriethoxysilane, (ethylenediaminepropyl)trimethoxysilane glycidoxypropyltrimethoxysilane, glycidoxypropyltriethoxysilane, hexenyltrimethoxysilane, 3-mercaptoproyltrimethoxysilane, methacryloyloxypropyl trimethoxysilane, 3-methacryloyloxypropyl triethoxysilane, 3-acryloyloxypropyl trimethoxysilane, 3-acryloyloxypropyl triethoxysilane, undecylenyltrimethoxysilane, vinyltrimethoxysilane, vinyltriethoxysilane, tetrapropylorthosilicate, tetrabutylorthosilicate, tetrakis(2-butoxyethyl)orthosilicate, and combinations thereof. Alternatively, the adhesion promoter may comprise a reaction product of a hydroxy-terminated polyorganosiloxane with an epoxy-functional alkoxysilane, as described above, or a physical blend of the hydroxy-terminated polyorganosiloxane with the epoxy-functional alkoxysilane such as a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methyvinyl/dimethylsiloxane copolymer. When used as a physical blend rather than as a reaction product, these components may be stored separately in multiple-part kits.

Suitable transition metal chelates include titanates such as tetrabutoxytitanate, zirconates such as zirconium acetylacetonate or zirconium tetrakisacetylacetonate, aluminum chelates such as aluminum acetylacetonate, and a combination thereof. Transition metal chelates and methods for their preparation are known in the art, see for example, U.S. Pat. No. 5,248,715, EP 0 493 791 A1, and EP 0 497 349 B1. One skilled in the art would recognize that some or all of the transition metal chelates can be condensation reaction catalysts and that the transition metal chelate that may be added as an adhesion promoter is added in addition to any condensation reaction catalyst.

Ingredient (VI) Filler

The hot melt composition may optionally further comprise 0.1 to 40 parts of filler based the weight of the composition. Examples of suitable fillers include calcium carbonates, fumed silica, silicate, metal oxides, metal hydroxides, carbon blacks, sulfates or zirconates. The filler may be the same as or different from the filler described above as ingredient (C). The filler may optionally be treated with a filler treating agent described above as ingredient (E). To improve stress-strain behavior and reduce creep, filler may be added to the hot melt composition in an amount ranging from 3% to 15%, alternatively 5% to 10%, based on the weight of the composition. The exact amount of filler to improve stress-strain behavior will vary depending on the type of filler selected and its particle size, for example 1% to 5% silica may be added or 6% to 10% calcium carbonate may be added.

Ingredient (VII) Solvent

Solvent may be used in producing the hot melt composition. Solvent aids with the flow and introduction of ingredients (I) and (II). However, essentially all of the solvent is removed in the continuous process for producing the hot melt adhesive. By essentially all of the solvent is removed, it is meant that the hot melt composition may contain no more than 0.05% to 5%, alternatively than 0.5% solvent based on the weight of the hot melt composition. If too much solvent is present the viscosity of the hot melt adhesive will be too low and the product performance will be hindered.

Solvents used herein are those that help fluidize the ingredients used in producing the hot melt composition but essentially do not react with any of the components in the hot melt adhesive. Suitable solvents are organic solvents such as toluene, xylene, methylene chloride, naphtha mineral spirit and low molecular weight siloxanes, such as phenyl containing polyorganosiloxanes.

Ingredient (VIII) Bodied Resin

Ingredient (VIII) may be a bodied MQ resin comprising a resinous core and a nonresinous polyorganosiloxane group. Ingredient (VIII) may be prepared by methods known in the art.

An MQ resin comprises siloxane units of the formulae $R^{11}_3SiO_{1/2}$ and $SiO_{4/2}$, where each $R^{11}$ is independently a monovalent hydrocarbon group, a monovalent halogenated hydrocarbon group, a hydrogen atom, or a hydroxyl group. Examples of monovalent hydrocarbon groups for $R^{11}$ include, but are not limited to, alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl. Examples of monovalent halogenated hydrocarbon groups for $R^{11}$ include, but are not limited to, chlorinated alkyl groups such as chloromethyl and chloropropyl groups and fluorinated alkyl groups such as 3,3,3 trifluoropropyl, 4,4,4,3,3-pentafluorobutyl, 5,5,5,4,4,3,3-heptafluoropentyl, and 6,6,6,5,5,4,4,3,3-nonafluorohexyl.

The MQ resin may have a ratio of M units to Q units (M:Q) of 0.5 to 1.2, alternatively 0.89:1 to 1:1. The MQ resin may have a number average molecular weight of 1,500 to 8,000, alternatively 5,000. The MQ resin may have a weight average molecular weight of 3,000 to 40,000, alternatively 15,000.

Methods of preparing MQ resins are known in the art. For example, a MQ resin may be prepared by treating a product produced by the silica hydrosol capping process of Daudt, et al. disclosed in U.S. Pat. No. 2,676,182. Briefly stated, the method of Daudt, et al. involves reacting a silica hydrosol under acidic conditions with a hydrolyzable triorganosilane such as trimethylchlorosilane, a siloxane such as hexamethyldisiloxane, or combinations thereof, and recovering a product comprising M and Q units (MQ resin). The resulting MQ resins may contain from 2 to 5 percent by weight of silicon-bonded hydroxyl groups.

A bodied MQ resin may be prepared from the MQ resin described above by methods known in the art, such as those disclosed in U.S. Pat. Nos. 5,726,256; 5,861,472; and 5,869,556. For example, the bodied MQ resin may be prepared by dissolving the MQ resin described above in a solvent, such as a solvent described herein as ingredient (VII); heating the MQ resin in the presence of an acid or base catalyst and a polydiorganosiloxane terminated with silicon-bonded hydroxyl groups; and removing water. The resulting product of this process is a bodied MQ resin comprising (i) a core and (ii) a polydiorganosiloxane group, where the polydiorganosiloxane group has a terminal silicon-bonded hydroxyl group. The bodied MQ resin may contain 0.5% to 2%, alternatively 0.75% to 1.25% hydroxyl groups.

The bodied MQ resin described above may optionally treated by dissolving the bodied MQ resin, a treating agent, and an acid catalyst or base catalyst in a solvent and heating the resulting combination until the hydroxyl content of the MQ resin is 0 to 2%, alternatively 0.5% to 1%. The treating agent may be a silane of the formula $R^{12}_3SiR^{13}$, where each $R^{12}$ is independently a monovalent hydrocarbon group such as methyl, vinyl, or phenyl, alternatively methyl; and $R^{13}$ is a group reactive with silanol. The acid catalyst may be trifluoroacetic acid. The base catalyst may be ammonia. The solvent may be a solvent described herein as ingredient (VII), such as xylene. The treating process reacts the $R^{13}$ substituted silicon atom a hydroxyl group in the MQ resin, thereby linking the $R^{12}_3Si$— group with a silicon atom in the MQ resin through a divalent oxygen atom.

Ingredient (VIII) can be a single bodied MQ resin or a combination comprising two or more bodied MQ resins that differ in at least one of the following properties: hydroxyl group content, ratio of amount of component (i) to component (ii), siloxane units, and sequence. The ratio of the amount of component (i) to amount of component (ii) may range from 1 to 2.5. The amount of ingredient (VIII) added to the composition depends on various factors including resin/polymer ratio, however, ingredient (VIII) may be added in an amount ranging from 30 to 70 parts based on the weight of the composition.

Ingredient (IX) Polyorganosiloxane Wax

Ingredient (IX) is a polyorganosiloxane wax, such as an alkylmethylsiloxane wax. Polyorganosiloxane wax may be added to the composition to improve green strength. Polyorganosiloxane waxes are disclosed in U.S. Pat. Nos. 7,074,490 and 5,380,527. The amount of ingredient (IX) may range from 0 to 5 parts per hundred parts of the hot melt composition.

The hot melt composition may be prepared by methods known in the art, for example, a suitable method comprises combining ingredients (I), (II), (II), (VII), and any additional ingredients, if present; feeding the combination through an extrusion device to remove volatiles; and recovering a hot melt composition having a non-volatile content of 95% or more.

HCR Composition

Alternatively, an HCR composition may be used instead of a seam sealant composition or a hot melt composition in the process described above. Commercially HCR compositions may be used, and examples include DOW CORNING® 20798, 20799, and 20800, which are commercially available from Dow Corning Corporation of Midland, Mich., U.S.A.

Airbag Component

The airbag components may be panels or patches, such as heat shield patches or reinforcing patches. Examples of suitable airbag components may be fabricated from woven or nonwoven fabrics, for example a nonwoven urethane or a woven synthetic resin such as Nylon. A suitable airbag component has a surface optionally coated with a commercially available airbag coating, such as a liquid silicone rubber. For example, DOW CORNING® LCF 3600 and LCF 4300 are liquid silicone rubbers commercially available from Dow Corning Corporation of Midland, Mich., U.S.A. See EP 1 179 454 p. 5, paragraph [0051] for exemplary airbag component materials of construction.

EXAMPLES

These examples are included to demonstrate the invention to those of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims.

Reference Example 1

Bag Assembly

A coated fabric panel (bottom panel) was secured on a substrate and a template was placed on top of the bottom panel. The template had a groove with a width of 6 mm and a height of 0.75 mm. Starting at the airbag inlet, a bead of curable sealant composition was applied to the bottom panel through the groove in the template. Excess curable sealant composition, if any, was removed with a scraper blade. The template was removed. A ⅛ inch diameter bead of hot melt composition was applied along the outside of the bead of curable sealant composition. A top panel of coated fabric was rolled into a 1 inch diameter tube having the coated side out. With light pressure (e.g., the tube was 25% depressed), the tube was unrolled at a 90 degree angle to an edge guide onto the bottom panel. A roller with slight pressure was used manually to roll back and forth and up and down across the top panel to form a bag. Rolling was repeated five times in each direction to remove air bubbles. The sealed bag was labeled and either set aside to cure if an ambient curing curable sealant composition was used or the bag was heat cured according to the procedure in reference example 2.

Reference Example 2

Heat Cure

The bag prepared in reference example 1 was placed on a hot plate at 70° C. (bottom plate) in a press. The curable sealant composition and hot melt composition flowed into each other with heat from the hot plate. The curable sealant composition was allowed to cure for 3 minutes. A spacer was used on the outside of the seams to provide a correct thickness for the hot melt adhesive. The spacer had a thickness of 1 to 1.3 mm. The press was closed for 1.3 to 3 minutes using a top plate at 125° C. and pressing pressure at 300 psi. The resulting airbag 100 was allowed to cool and inspected for air bubbles and gaps where the hot melt adhesive 102 and seam sealant 104 did not flow together.

Reference Example 3

Dynamic Testing

A deployment tank was filled to a pressure ranging from 269 kPa to 290 kPa. The valve on the deployment tank was opened to allow the contents to enter an airbag. Initial deployment pressure in the bag was measured, and pressure over time was tracked. Time for pressure to reduce to 70% of initial deployment pressure or time to reach 50 kPa in the bag was measured.

Reference Example 4

Hardness Measurement

Hardness may be measured according to ASTM Standard C661. Shore A hardness of DOW CORNING® HM 2510 used in the examples below was 45 after 21 days of room temperature cure. Durometer of DOW CORNING® SE 6711 and SE 6777 are in Table 1.

TABLE 1

|  | Duro at 45 min | 65 min | 80 min | 95 min |
| --- | --- | --- | --- | --- |
| SE 6711 | 7.6 | 9.8 | 8.6 | 8.8 |
| SE 6777 | 11.8 | 11.3 | 10.7 | 11 |

Reference Example 5

Modulus, Elongation, and Tensile Strength Measurement

Modulus, elongation, and tensile strength may be measured according to ASTM Standard D 412 at room temperature (20° C. to 25° C.) and 500 mm/minute pull rate. After curing for 21 days at room temperature and ambient conditions, DOW CORNING® HM 2510 had modulus of 45 psi, elongation of 725%, and tensile strength of 428 psi. Tensile strength, elongation, and modulus of DOW CORNING® SE 6711 and SE 6777 are in Table 2.

TABLE 2

|  | Elongation % | Tensile Strength lbf/sq in | Modulus at 50% lbf/cu in | Modulus at 100% lbf/cu in |
| --- | --- | --- | --- | --- |
| SE6711 | 1292.5 | 214.5 | 19.1 | 23.7 |
| SE6777 | 1250.0 | 286.5 | 16.0 | 19.4 |

Reference Example 6

Viscosity Measurement

Viscosity of uncured DOW CORNING® HM 2510 was 113 Pa·s at 120° C.

Comparative Example 1

Sewn Bags

Seven airbags were prepared according to the methods of reference examples 1 and 2, except that the hot melt composition was omitted, and a seam was sewn through the bead of seam sealant. The seam had 10 stitches per inch using a single lock stitch. The fabric panels were coated with DOW CORNING® LCF 3600, and the curable sealant composition was DOW CORNING® SE 6777. The airbags were tested according to the method of reference example 3. Initial deployment pressure was 130 kPa. Time for each airbag to reach 50 kPa averaged 12.5 seconds. This represents pressure retention of only 39% after 12.5 seconds.

Examples 1 to 9

Bags with Hot Melt and Sealant

Nine airbags were prepared according to the methods of reference examples 1 and 2. The fabric panels were coated with DOW CORNING® 3600, and the curable sealant composition was SE 6777 as in comparative example 1. However, a bead of DOW CORNING® HM 2510 hot melt composition was applied next to the bead of curable sealant composition. The bead of hot melt composition was 6 mm wide by 0.6 mm high.
The airbags were tested according to the method in reference example 3. The results are in Table 3.

TABLE 3

| | Initial Deployment Pressure (kPa) | Pressure after 30 seconds (kPa) | Pressure Retention after 30 seconds (%) | Pressure after 60 seconds (kPa) |
|---|---|---|---|---|
| Ex. 1 | 84 | 70 | 83 | 54 |
| Ex. 2 | 88 | 79 | 90 | 67 |
| Ex. 3 | 102 | 90 | 88 | 78 |
| Ex. 4 | 100 | 88 | 88 | 75 |
| Ex. 5 | 101 | 90 | 89 | 79 |
| Ex. 6 | 110 | 99 | 90 | 82 |
| Ex. 7 | 115 | 106 | 92 | 87 |
| Ex. 8 | 112 | 104 | 93 | 84 |
| Ex. 9 | 104 | 95 | 91 | 88 |

Comparative example 1 and examples 1 to 9 show that pressure retention is improved by using hot melt adhesive to replace sewn seams in these airbags. Examples 1 to 9 have better pressure retention after 30 seconds than comparative example 1 has after 12.5 seconds.

Comparative Examples 2-5

Airbag Assembly Using a Different Process

Four airbags were prepared according to the methods of reference examples 1 and 2, except that the curable sealant composition was cured to form the seam sealant before the hot melt composition was applied and pressing pressure was 250 psi. The fabric panels were coated with DOW CORNING® 3600, the curable sealant composition was SE 6777, and the hot melt composition was DOW CORNING® HM 2510. The hot melt composition was applied next to the bead of seam sealant. The bead of hot melt composition was 6 mm wide by 0.6 mm high. The airbags were tested according to the method in reference example 3. The results are in Table 4.

TABLE 4

| | Initial Deployment Pressure (kPa) | Pressure after 30 seconds (kPa) | Pressure Retention after 30 seconds (%) | Pressure after 60 seconds (kPa) |
|---|---|---|---|---|
| Comp. Ex. 2 | 84 | 65 | 77 | 49 |
| Comp. Ex. 3 | 92 | 60 | 65 | 43 |
| Comp. Ex. 4 | 102 | 52 | 51 | 31 |
| Comp. Ex. 5 | 115 | 20 | 17 | 5 |

Examples 1-9 and comparative examples 2-5 show that the process described herein improves pressure retention when DOW CORNING® SE 6777 and DOW CORNING® HM 2510 are used to fabricate airbags under the conditions in reference examples 1 and 2.

Comparative Example 6

Airbag Assembly Using a Different Press Pressure

An airbag was prepared as in examples 1 to 9, except that the press was held at 1800 psig instead of 300 psig. The initial deployment pressure was 95 kPa. The pressure at 30 seconds was 10 kPa, and the pressure at 60 seconds was 0 kPa. Without wishing to be bound by theory, it is thought that the airbag was pressed too thin (0.3 mm) by the increase pressure in the press.

Examples 10-19

Airbag Assembly Using Different Configurations of Materials

In examples 10 to 19, the fabric panels used were coated with DOW CORNING® LCF 4300. The airbags were evaluated according to the method in reference example 3. The results are in Table 5.

In example 10, an airbag was prepared according to the methods in reference examples 1 and 2, with the following exceptions. The hot melt composition was replaced with a high consistency rubber composition. The curable sealant composition was DOW CORNING® SE 6777, and the high consistency rubber composition was DOW CORNING® 20799. The hot plate (bottom plate) in the press was 104° C. The press was closed for 3 minutes using a top plate at 182° C.

In examples 11 to 14, airbags was prepared using the configuration of hot melt composition and curable sealant composition in FIG. 5. The hot melt composition had the form of ¼ inch balls, which were placed in a bead of curable sealant composition 12 mm wide and 1 mm thick. The curable sealant composition was DOW CORNING® SE 6750, and the hot melt composition was DOW CORNING® HM 2510. The compositions were cured under ambient conditions. Example 16 was prepared using the same method as examples 11-14, except the configuration of hot melt composition and curable sealant composition in FIG. 6 was used.

In examples 15, 18, and 19, airbags was prepared using the configuration of hot melt composition and curable sealant composition in FIG. 5. The hot melt composition had the form of ¼ inch balls, which were placed in a bead of curable sealant composition 12 mm wide and 1 mm thick. The curable sealant composition was DOW CORNING® SE 6777, and the hot melt composition was DOW CORNING® HM 2510. The hot plate (bottom plate) in the press was 104° C. The press was closed for 3 minutes using a top plate at 121° C. Example 17 was prepared using the same method as examples 15, 18, and 19, except that pressing pressure was 1800 psi, instead of 300 psi as specified in reference example 2.

TABLE 5

| | First Material | Second Material | Configuration | Cure | Initial Deployment Pressure (kPa) | Time to reach 50 kPa (seconds) |
|---|---|---|---|---|---|---|
| Ex. 10 | SE6777 | 20799 | FIG. 1 | Heat | 100 | 40 |
| Ex. 11 | SE6750 | HM2510 | FIG. 5 | Amb | 105 | 21 |
| Ex. 12 | SE6750 | HM2510 | FIG. 5 | Amb | 108 | 19.5 |
| Ex. 13 | SE6750 | HM2510 | FIG. 5 | Amb | 120 | 15.5 |
| Ex. 14 | SE6750 | HM2510 | FIG. 5 | Amb | 120 | 8 |
| Ex. 15 | SE6777 | HM2510 | FIG. 5 | Heat | 130 | 24 |
| Ex. 16 | SE6750 | HM2510 | FIG. 6 | Amb | 132 | 20 |
| Ex. 17 | SE6777 | HM2510 | FIG. 5 | Heat | 152 | 25 |
| Ex. 18 | SE6777 | HM2510 | FIG. 5 | Heat | 175 | 14 |
| Ex. 19 | SE6777 | HM2510 | FIG. 5 | Heat | 190 | 13 |

Industrial Applicability

The airbags described above are useful in automobile applications such as driver's seat, front passenger's seat, rear passenger's seat, side impact, and inflatable curtain; as well as other applications such as aircraft. For example, the process and compositions described above may be used to assemble the airbags disclosed in U.S. Pat. No. 6,886,857.

The process described above may replace sewn seams with hot melt adhesive that provides sufficient bonding strength to offset need for mechanical strength through sewing. The process and compositions described herein may provide the advantages of: high peel strength of complete system seams; low pressure loss with time as compared to airbags not made with the combination of hot melt adhesive and seam sealant described herein; meeting requirements for folding and packing (foldability and packability), and other airbag requirements; flexibility on handling and cure of the system; and process times that may be 3 minutes per airbag, or less. Various seam sealants and hot melt adhesives may be combined to balance assembly time with development of green strength.

The process and compositions described herein may provide the benefits of: improving process efficiency to assemble airbags because mechanical bonding and sealing are combined; reducing the amount of seam sealant as compared to sewn airbags; improving holdup performance with an integral silicone system; and eliminating damage to fibers in airbag fabric from sewing.

The invention claimed is:

1. A process for fabricating an airbag comprises:
   1) applying a first bead of a first polyorganosiloxane composition to an airbag component,
   2) applying a second bead of a second polyorganosiloxane composition to the same airbag component or a different airbag component,
   3) contacting the first polyorganosiloxane composition and the second polyorganosiloxane composition between two airbag components,
   4) compressing the two airbag components to form a seam at least 0.5 mm thick; where the seam comprises a first material made from the first composition and a second material made from the second composition, where the first material and the second material differ in hardness, modulus, or both; and
   where the first material is located toward the interior of the airbag, the second material is located toward the exterior of the airbag, and the first material and the second material contact each other; thereby eliminating the need for sewing one or more of seams in the airbag.

2. The process of claim 1, where the first composition is a curable sealant composition, the second composition is a hot melt composition, the first material is a seam sealant, and the second material is a hot melt adhesive.

3. The process of claim 2, where the hot melt composition is cooled to form the hot melt adhesive.

4. The process of claim 2, where the hot melt composition is cured to form the hot melt adhesive.

5. The process of claim 2, where step 2) is performed by extruding a continuous bead of the hot melt composition next to a continuous bead of the curable sealant composition and the process further comprises curing the hot melt composition.

6. The process of claim 2, where the hot melt composition is applied in a segmented pattern and cooled before step 3).

7. The process of claim 2, where the curable sealant composition is a hydrosilylation reaction curable polyorganosiloxane composition.

8. The process of claim 2, where the hot melt composition is a condensation reaction curable polyorganosiloxane composition.

9. The process of claim 2, further comprising applying a second hot melt composition to the airbag component after step 2) and before step 3).

10. The process of claim 1, where the first material is a seam sealant and the second material is a high consistency rubber.

11. The process of claim 1, where the first material is a first hot melt adhesive and the second material is a second hot melt adhesive having a higher modulus as compared to the first hot melt adhesive.

12. The process of claim 1, where the airbag component is coated with a liquid silicone rubber.

13. The process of claim 1, where the airbag component comprises a panel having a surface coated with a liquid silicone rubber.

14. The process of claim 1, further comprising applying an adhesion promoter to the airbag component before applying the first composition and the second composition.

15. The process of claim 1, where the first material or the second material, or both, is made by a method comprising placing the product of step 3) on a heated substrate during or after step 4).

16. An airbag prepared by the process of claim 1.

17. A process for fabricating an airbag comprises:
   1) applying a first bead of a first polyorganosiloxane composition to an airbag component,
   2) applying a second bead of a second polyorganosiloxane composition to the same airbag component or a different airbag component,
   3) contacting the first polyorganosiloxane composition and the second polyorganosiloxane composition between two airbag components,
   4) compressing the two airbag components to form a seam; where the seam comprises a first material made from the first composition and a second material made from the second composition, where the first material and the second material are different compositions; and
   where the first material is located toward the interior of the airbag, the second material is located toward the exterior of the airbag, and the first material and the second material contact each other; thereby eliminating the need for sewing one or more of seams in the airbag.

18. The process of claim 17, where first composition is a curable sealant composition and the second composition is a hot melt composition.

19. The process of claim 18, where the hot melt composition is a condensation reaction curable polyorganosiloxane composition and the curable sealant composition is a hydrosilylation reaction curable polyorganosiloxane composition.

20. The process of claim 17 wherein the first material and the second material differ in hardness, modulus, or both.

* * * * *